(12) United States Patent
Aljabari et al.

(10) Patent No.: US 8,051,638 B2
(45) Date of Patent: Nov. 8, 2011

(54) SYSTEMS AND METHODS FOR EXHAUST GAS RECIRCULATION (EGR) FOR TURBINE ENGINES

(75) Inventors: Samer Aljabari, Greenville, SC (US); Michael John Bowman, Niskayuna, NY (US); Luciano Joseph Cerone, Simpsonville, SC (US); Scott Mordin Hoyte, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 917 days.

(21) Appl. No.: 12/033,183

(22) Filed: Feb. 19, 2008

(65) Prior Publication Data

US 2009/0205334 A1    Aug. 20, 2009

(51) Int. Cl.
*F02C 7/08* (2006.01)
*F02C 6/00* (2006.01)
*F02C 9/00* (2006.01)

(52) U.S. Cl. .......... 60/39.52; 60/39.182; 60/773
(58) Field of Classification Search ............ 60/39.52, 60/39.182, 39.53, 39.5, 773
See application file for complete search history.

(56) References Cited

U.S. PATENT DOCUMENTS

| | | | | |
|---|---|---|---|---|
| 2,621,475 A * | 12/1952 | Loy | ......... | 60/774 |
| 3,785,145 A * | 1/1974 | Amann | ......... | 60/39.24 |
| 3,844,113 A * | 10/1974 | Lockwood, Jr. | ......... | 60/39.15 |
| 4,133,171 A * | 1/1979 | Earnest et al. | ......... | 60/39.182 |
| 4,204,401 A * | 5/1980 | Earnest | ......... | 60/773 |
| 4,271,664 A * | 6/1981 | Earnest | ......... | 60/39.181 |
| 4,313,300 A * | 2/1982 | Wilkes et al. | ......... | 60/775 |
| 4,434,613 A * | 3/1984 | Stahl | ......... | 60/784 |
| 4,936,088 A * | 6/1990 | Bell | ......... | 60/777 |
| 5,794,431 A * | 8/1998 | Utamura et al. | ......... | 60/783 |
| 6,173,562 B1 * | 1/2001 | Utamura et al. | ......... | 60/773 |
| 6,202,400 B1 * | 3/2001 | Utamura et al. | ......... | 60/773 |
| 6,256,976 B1 * | 7/2001 | Kataoka et al. | ......... | 60/775 |
| 6,363,709 B2 * | 4/2002 | Kataoka et al. | ......... | 60/775 |
| 6,598,402 B2 * | 7/2003 | Kataoka et al. | ......... | 60/775 |
| 6,718,771 B1 * | 4/2004 | Kopko | ......... | 60/773 |
| 6,957,539 B2 * | 10/2005 | Lebas et al. | ......... | 60/772 |
| 7,559,977 B2 * | 7/2009 | Fleischer et al. | ......... | 95/236 |
| 2005/0076645 A1 * | 4/2005 | Frutschi et al. | ......... | 60/772 |
| 2007/0261408 A1 * | 11/2007 | Carrea et al. | ......... | 60/772 |

* cited by examiner

*Primary Examiner* — William Rodriguez
*Assistant Examiner* — Gerald Sung
(74) *Attorney, Agent, or Firm* — Sutherland Asbill & Brennan LLP

(57) ABSTRACT

Systems and methods may be provided for exhaust gas recirculation. The systems and methods may include receiving, via an intake section, inlet air at an input of a compressor, generating compressed air at the compressor using the received inlet air, and providing the compressed air from the compressor to a combustor, where the combustor produces combustion involving the compressed air and fuel. The systems and methods may also include receiving combustion products associated with the combustion at a turbine component, where the turbine component releases exhaust gases, and recirculating at least a portion of the exhaust gases to the intake section via a recirculation line, where the recirculated exhaust gases raise a temperature of the inlet air.

18 Claims, 6 Drawing Sheets

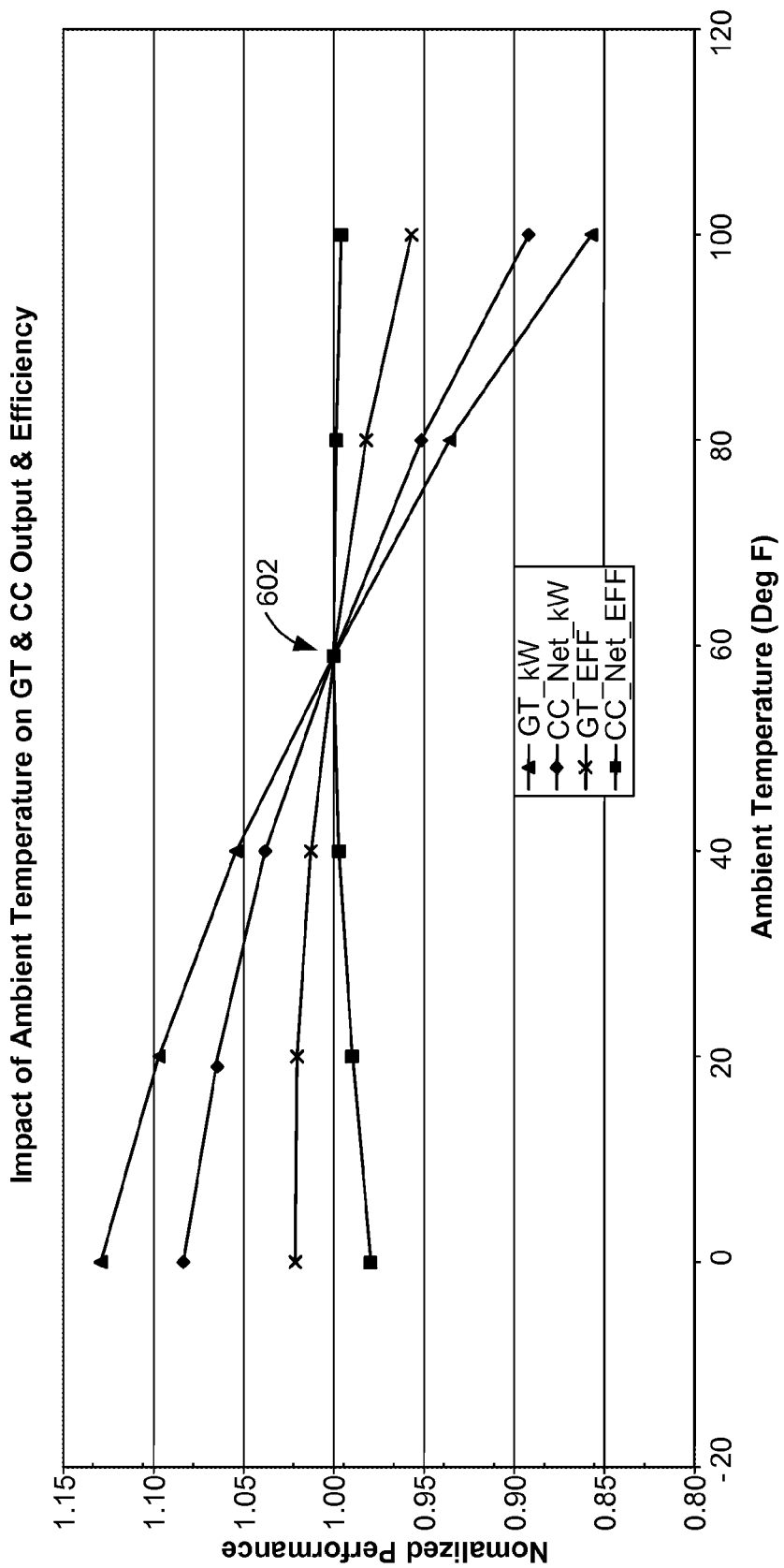

SYSTEMS AND METHODS FOR EXHAUST GAS RECIRCULATION (EGR) FOR TURBINE ENGINES

BACKGROUND OF THE INVENTION

1. Field of the Invention

Aspects of embodiments of the invention relate generally to turbine engines, and more particularly, to the use of exhaust gas recirculation (EGR) for turbine engines.

2. Background of the Invention

Gas turbine engines are typically tuned to an optimal temperature range. If the ambient temperature at the inlet of a turbine engine deviates from that optimal temperature range, then the gas turbine engine and/or combined cycle may experience undesirable variations in efficiency, performance, output, stress, etc. Accordingly, there is a need in the industry for maintaining the ambient temperature of the inlet of the turbine engine at an optimal temperature under certain conditions in order to reduce operational variations.

SUMMARY OF THE INVENTION

A technical effect of an embodiment of the invention may be the reduction of operational variation and/or impact on turbine engines and/or the combined cycle.

According to an example embodiment of the invention, there may be a method for exhaust gas recirculation. The method may include receiving, via an intake section, inlet air at an input of a compressor, generating compressed air at the compressor using the received inlet air, and providing the compressed air from the compressor to a combustor, wherein the combustor produces combustion involving the compressed air and fuel. The method may also include receiving combustion products associated with the combustion at a turbine component, wherein the turbine component releases exhaust gases, and recirculating at least a portion of the exhaust gases to the intake section via a recirculation line, wherein the recirculated exhaust gases raise a temperature of the inlet air.

According to another example embodiment of the invention, there may be a system for exhaust gas recirculation. The system may include a compressor, where the compressor receives inlet air via an intake section and generates compressed air using the received inlet air, a combustor that receives fuel and compressed air generated by the compressor, wherein the combustor produces combustion involving the compressed air and fuel, and a turbine component that receives combustion products associated with the combustion, wherein the turbine component releases exhaust gases. The system may also include a recirculation line for circulating at least a portion of the exhaust gases to the intake section, where the recirculated exhaust gases raise a temperature of the inlet air.

According to yet another example embodiment of the invention, there may be system for exhaust gas recirculation. The system may include a compressor, wherein the compressor receives inlet air via an intake section and generates compressed air using the received inlet air, a combustor that receives fuel and compressed air generated by the compressor, where the combustor produces combustion involving the compressed air and fuel, a turbine component that receives combustion products associated with the combustion, where the turbine component releases exhaust gases, and means for circulating at least a portion of the exhaust gases to the intake section, wherein the recirculated exhaust gases raise a temperature of the inlet air.

BRIEF DESCRIPTION OF THE DRAWINGS

Figure 1:
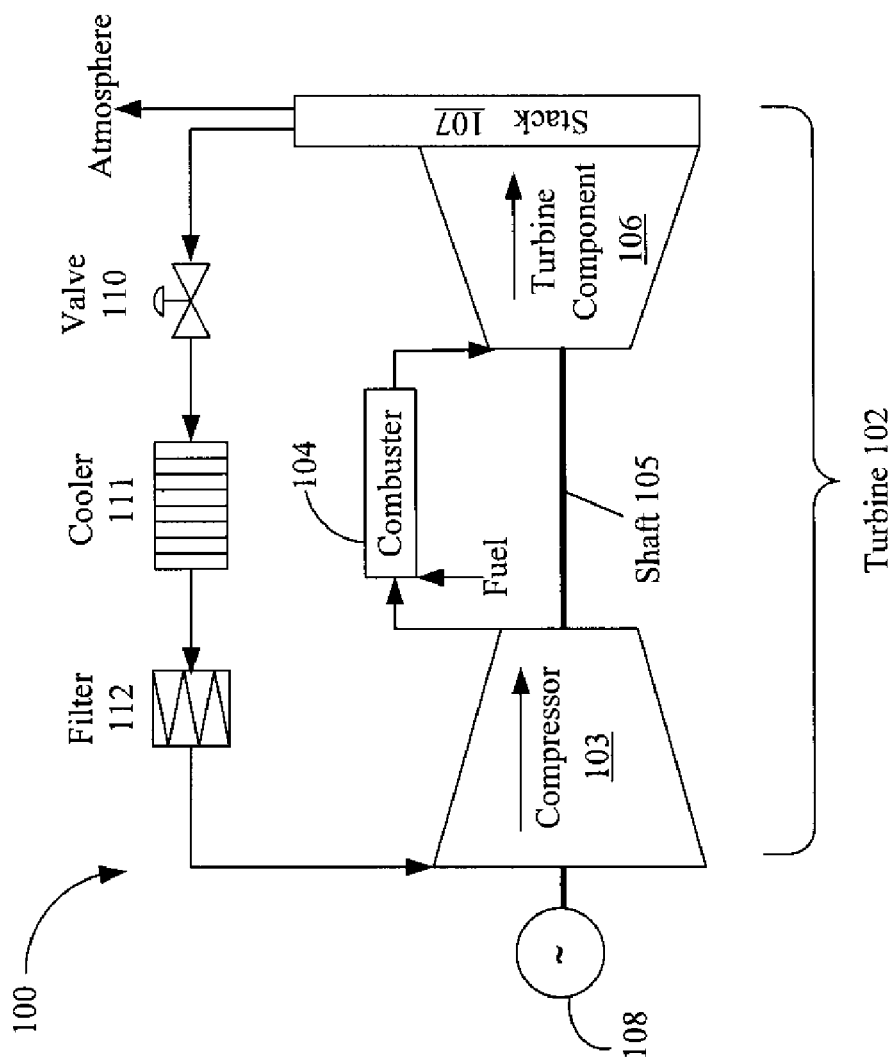

Having thus described aspects of the invention in general terms, reference will now be made to the accompanying drawings, which are not necessarily drawn to scale, and wherein:

FIG. 1 illustrates an example of a turbine system utilizing exhaust gas recirculation, according to an example embodiment of the invention.

Figure 2:
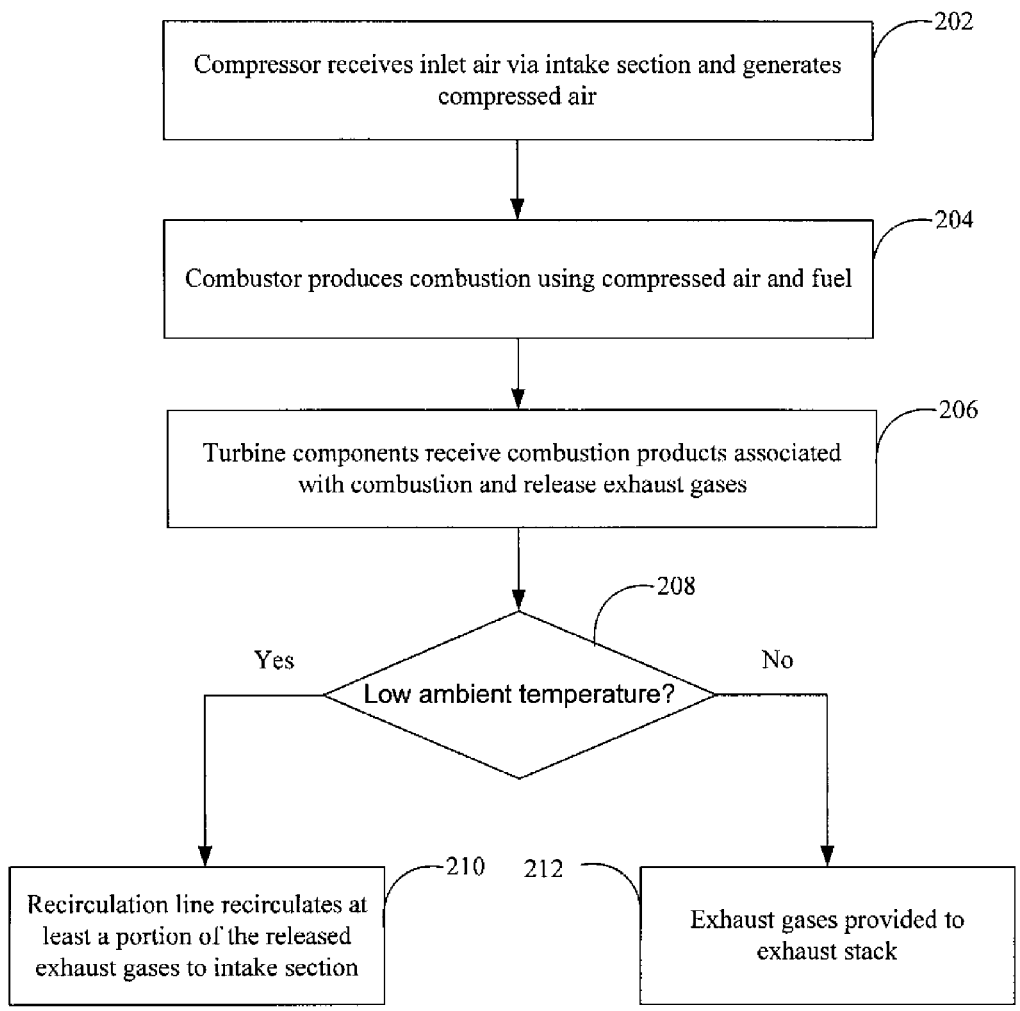

FIG. 2 illustrates an operation of the turbine system of FIG. 1 in accordance with an example embodiment of the invention.

Figure 3:
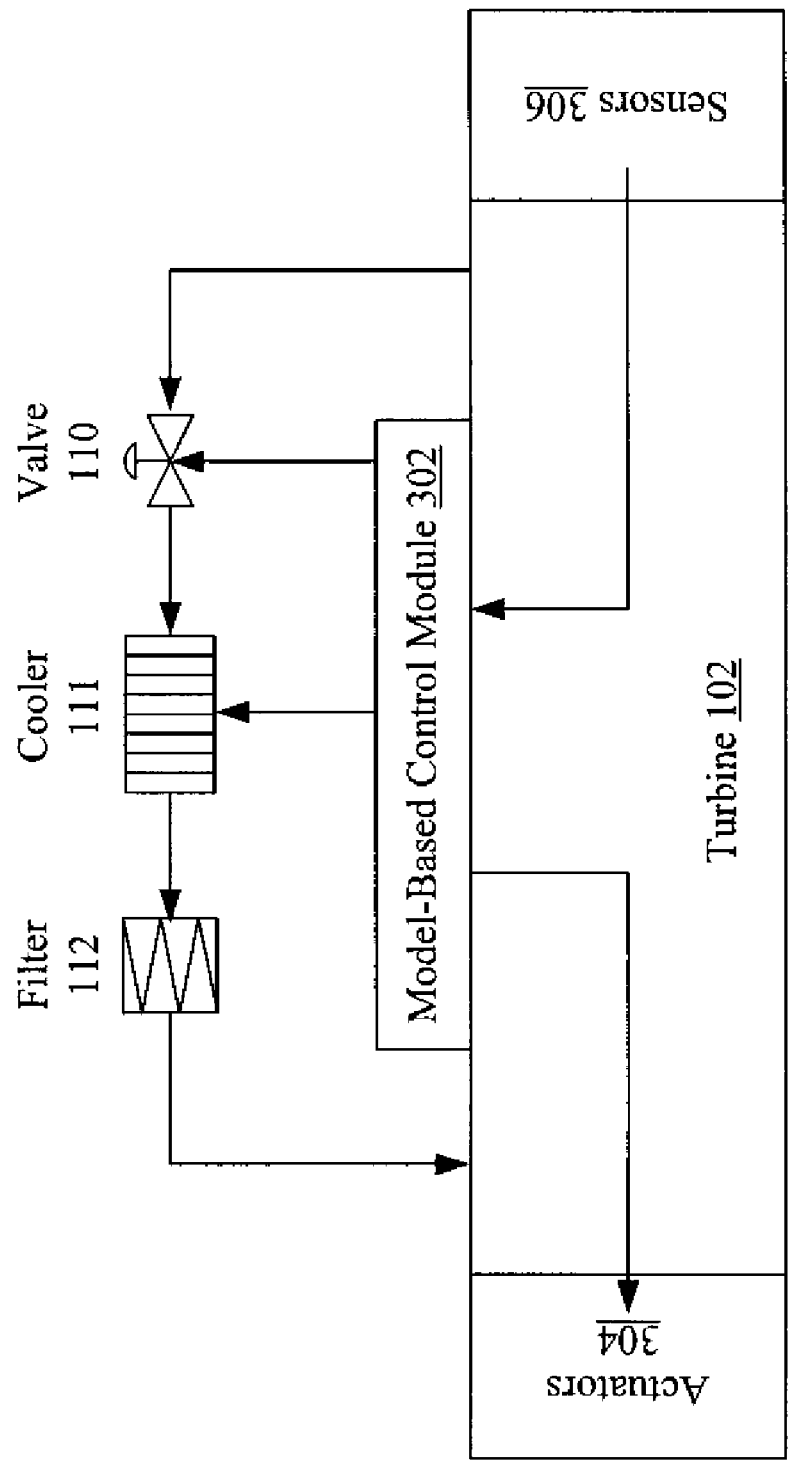

FIG. 3 illustrates a control module for operating a gas turbine engine, including an exhaust gas recirculation for the gas turbine engine, according to an example embodiment of the invention.

Figure 4:
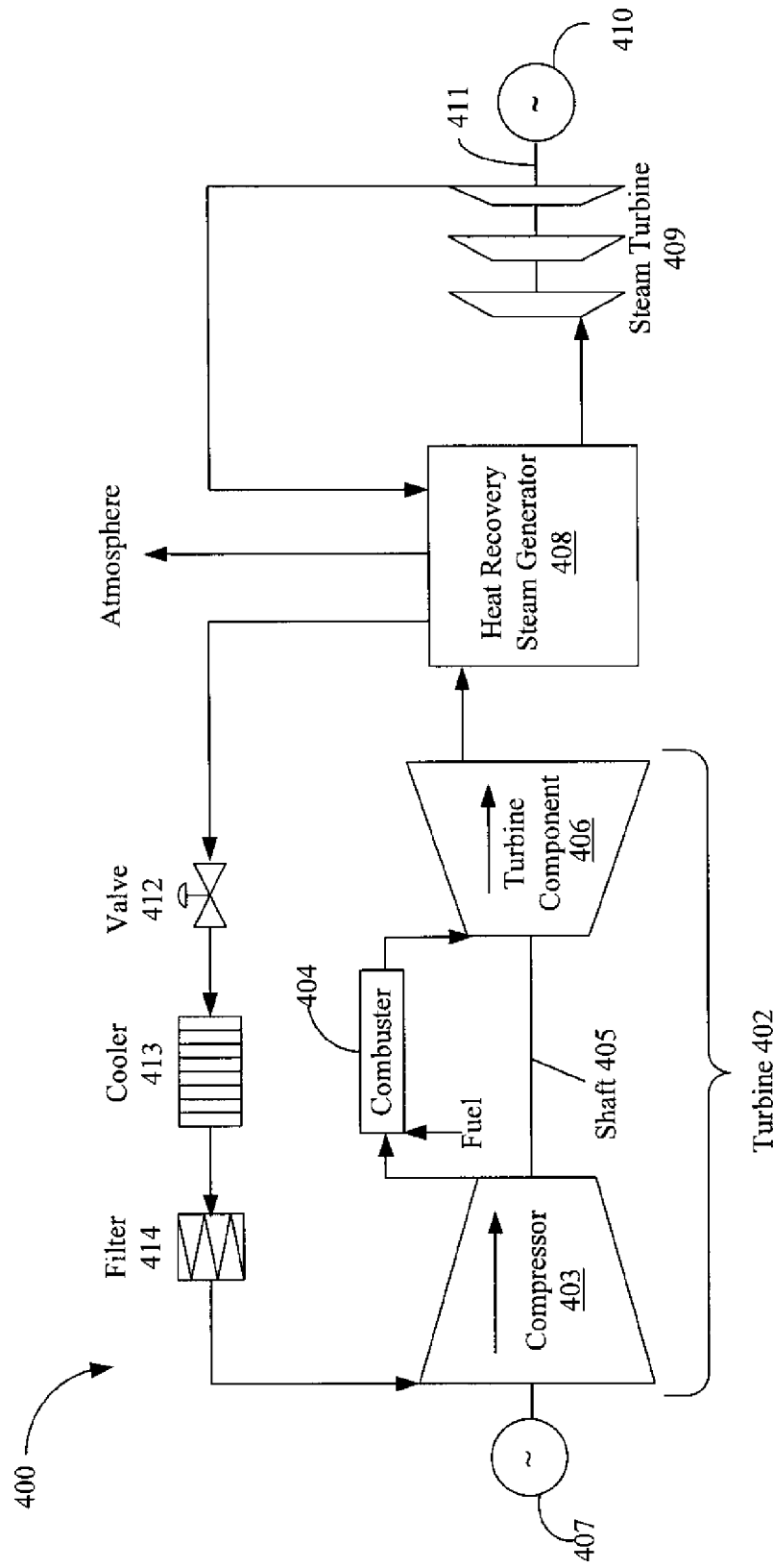
Figure 5:
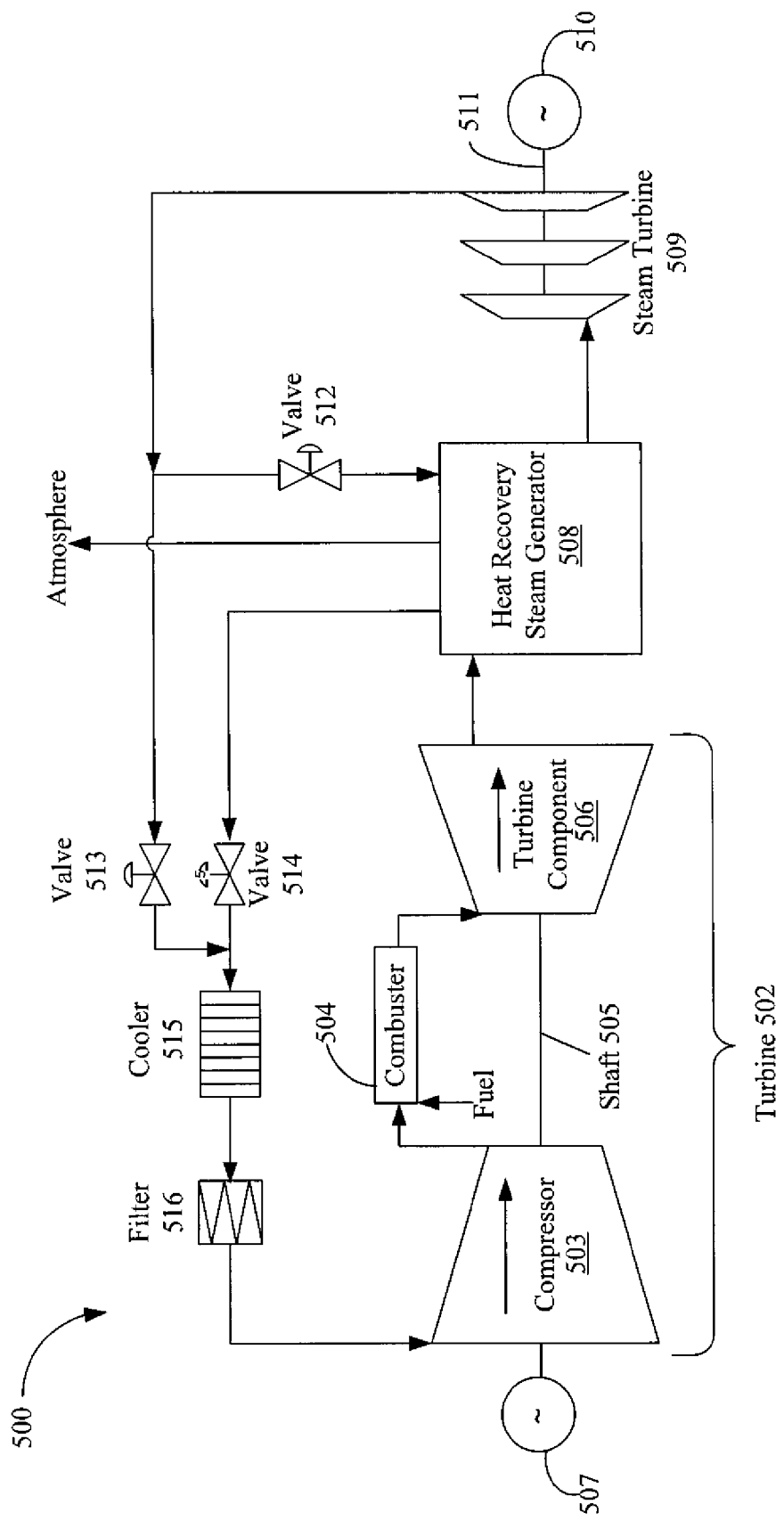

FIGS. 4 and 5 illustrates alternative examples of turbine systems utilizing exhaust gas recirculation, according to example embodiments of the invention.

FIG. 6 provides an example chart that demonstrates an effect of ambient temperature variations on gas turbine output (kW), efficiency (EFF), and combined cycle (cc), according to an example embodiment of the invention.

DETAILED DESCRIPTION OF THE INVENTION

Embodiments of the invention now will be described more fully hereinafter with reference to the accompanying drawings, in which some embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Like numbers refer to like elements throughout.

In general, embodiments of the invention may provide systems and methods for recirculating exhaust gases to an intake (e.g., inlet) of the turbine engine. By recirculating the exhaust gases, the ambient temperature of the inlet air of the turbine engine may be raised appropriately, according to an example embodiment of the invention. Indeed, the recirculation of exhaust gases may allow for reducing the operational variation and impact on hardware of the turbine engine. Example aspects of recirculation may include one or more of de-icing, reducing combustion dynamics, eliminating wide ambient temperature range tuning, eliminating or reducing a need for inlet bleed heat (IBH), reducing undue stress on the rotor, minimizing risk of compressor surge, according to an example embodiment of the invention.

FIG. 1 illustrates an example of a turbine system 100 utilizing exhaust gas recirculation, according to an example embodiment of the invention. In FIG. 1, there is a turbine engine 102 such as a gas turbine engine that comprises a compressor 103, a combustor 104, a rotor or shaft 105, a turbine component 106, and a generator 108, according to an example embodiment of the invention. The rotor or shaft 105 may physically connect the compressor 103 and the turbine component 106. According to an example embodiment of the invention, the compressor 103 and the turbine component 106, or at least a portion thereof, may be rotatable with the rotor or shaft 105. Likewise, the generator 108 (e.g., load) may be connected to the rotor or shaft 105. It will be appreciated that while FIG. 1 illustrates the generator 108 positioned at a front section of the turbine engine 102, this depiction is for illustrative purposes only, and the generator 108 could likewise be positioned at the rear section of the turbine engine without departing from embodiments of the invention.

The operation of the turbine system of FIG. 1 will now be discussed with respect to the flow diagram of FIG. 2. At block 202, the compressor 103 receives inlet air via an intake section of the turbine engine 102. As the inlet air is moved through the compressor 103, the pressure of the air increases and compressed air is generated at an output of the compressor 103. The compressed air generated at the output of the compressor 103, or at least a portion thereof, may be provided to the combustor 104. In an example embodiment of the invention, the compressor 103 may comprise a plurality of rotary fan blades for moving air through the compressor to generate the compressed air.

At block 204, the combustor 104 may receive the compressed air along with fuel such as a petroleum-based fuel (e.g., kerosene, jet fuel, etc.), propane, natural gas, or another combustible fuel or gas. In general, the combustor 104 may produce combustion using the compressed air and fuel. Combustion products, such as hot gases, may be generated as a result of the combustion. The combustion products are then provided or exhausted from the combustor 104 to the turbine component 106, as illustrated in block 206. According to an example embodiment of the invention, the combustion products may move through the turbine component 106, and move (e.g., spin) blades of the turbine component 106. In an embodiment of the invention, the motion of the blades of the turbine component 106 may likewise drive the compressor 103 and the generator 108 via the rotor or shaft 105. Exhaust gases may then be released by the turbine component 106 via an exhaust section of the turbine engine 102. According to an example embodiment of the invention, the exhaust gases may be in the range of 150-180 degrees Fahrenheit (approximately 65.56-82.22 degrees Celsius). However, in other embodiments of the invention, the exhaust gases may be in other temperature ranges as well, including temperatures that are lower than 150 degrees Fahrenheit (approximately 65.56 degrees Celsius) or higher than 180 degrees Fahrenheit (approximately 82.22 degrees Celsius). While illustrative temperature ranges have been presented herein, it will be appreciated that those temperature ranges are for illustrative purposes only and are not intended to limit the operational temperature range associated with example embodiments of the invention.

At block 108, a control module associated with the turbine engine 102 may determine, perhaps via a temperature sensor, whether an ambient temperature at the intake section of the turbine engine is lower than an optimal or desired/predetermined temperature or temperature range (e.g., ISO inlet temperature). If the control module determines that the temperature at the intake section needs to be increased, then the control module may allow at least a portion of the exhaust gases to be introduced or directed into a recirculation line (e.g., piping) controlled by one or more valves 110, as provided at block 210. By adjusting a position (e.g., closed, one or more open positions) of one or more valves 110, the amount of recirculated exhaust gases may be adjusted accordingly. For example, in an illustrative embodiment of the invention, a range of 10% to 60% of the exhaust gases may be directed to the recirculation line. It will be appreciated that the range of recirculated exhaust gases may be adjusted outside of the illustrative range of 10% to 60% without departing from embodiments of the invention. According to an example embodiment of the invention, there may be differential pressure between an inlet (e.g., intake) and exhaust of the turbine engine 102, and accordingly, no pressurization may be needed to move the recirculated exhaust gas along the recirculation line to the intake section of the turbine engine 102. However, in an alternative embodiment of the invention, pressurization, perhaps created by one or more fans, may be used in move, or additionally move, the exhaust gas as well in the recirculation line.

Additionally, the recirculation line may optionally include one or both of a heat exchanger 111 and a filter 112, according to an example embodiment of the invention. The heat exchanger 111 may lower or reduce the temperature of the exhaust gases in the recirculation line prior to being provided to the intake section. The beat exchanger 111 may be a cooler, according to an example embodiment of the invention. Likewise, the filter 112 may be operative to remove particulate matter from the recirculated exhaust gases. It will also be appreciated that a catalytic converter may optionally be provided in the recirculation line or prior to the exhaust gases entering the recirculation line as an after-treatment for the exhaust gases. The catalytic converter may be operative to remove pollutants from the exhaust gases. For example, a selective catalytic reduction (SCR) catalytic converter may be utilized to remove oxides of nitrogen (NOx) from the exhaust gases.

Still referring to block 210, any exhaust gases that are not directed to the recirculation line may be provided to an exhaust stack 107 associated with the turbine component 106 that releases the exhaust gases, perhaps into the atmosphere. It will be appreciated that in alternative embodiments of the invention, the exhaust gases may also be recaptured for use in driving a steam turbine or another device.

Referring back to block 208, the control module may determine that the temperature at the intake section does not need to be increased, in which case the exhaust gases are provided to the exhaust stack 107, as provided by block 212. However, it will be appreciated that alternatively, the exhaust gases may be recaptured for use in driving a steam turbine.

A control module that operates a gas turbine engine, including the exhaust gas recirculation for the gas turbine engine, will be described in further detail with respect to FIG. 3. As shown in FIG. 3, a control module 302 such as a model-based control (MBC) module may receive data from one or more sensors 306 and provide control signals to one or more actuators 304, as well as the control valve 110 and heat exchanger 111 of the recirculation line. The actuators may adjust the fuel flow, inlet guide vane position, and inlet bleed heat airflow for the turbine engine 102, according to a desired operation of the turbine engine 102, according to an example embodiment of the invention. The sensors 306 may include temperature sensors that determine an ambient temperature at an intake section of the turbine engine 102 (e.g., input of compressor), at the exhaust section of the turbine engine, or at another location on or around the turbine engine 102. It will be appreciated that the sensors 306 may include other sensors as well, including sensors for detecting the compressor discharge pressure (PCD), compressor discharge temperature (TCD), and output power (MW).

According to an example embodiment of the invention, a temperature sensor 102 at an intake section may provide temperature data to the control module 302. Based upon this temperature sensor, the control module 302 may determine that the ambient temperature at the intake section is lower than the optimal or desired/predetermined temperature or temperature range. In this situation, the control module 302 may increase an amount of exhaust gases that are directed to the recirculation line by adjusting a position of valve 110

(e.g., placing the valve 110 to one or more open positions) using one or more control signals. Likewise, the control module 302 may also operate the heat exchanger 111 as necessary to reduce the temperature of the exhaust gases in the recirculation line. According to an example embodiment of the invention, the heat exchanger 111 may also include a mechanism for removing condensate resulting from operation of the heat exchanger 111.

It will be appreciated that many modifications can be made to the turbine system discussed with respect to FIGS. 1-3 above. While FIGS. 4 and 5 below illustrate some alternative embodiments of the a turbine system, it will be appreciated that yet further variations are available without departing from embodiments of the invention.

FIG. 4 illustrates a turbine system 400 that includes both a gas turbine engine 402 and a steam turbine engine 409, according to an example embodiment of the invention. As shown in FIG. 4, the gas turbine engine 402, which is similar to the turbine engine 102 of FIG. 1, may comprise a compressor 403, a combustor 404, a rotor or shaft 405, a turbine component 406, and a generator 408, according to an example embodiment of the invention. According to an example embodiment of the invention, the exhaust gases from the turbine component 406 may be provided to a heat recovery steam generator (HSRG) 408 for reheating steam from a steam turbine engine 409. In particular, condensed steam may be received from the steam turbine engine 409 by the HSRG 408 and reheated steam may be returned to the steam turbine engine 509. The steam turbine engine 409 may then drive generator 410 via a rotor or shaft 411. The exhaust gases from the steam turbine 409 may likewise be recirculated back to the HSRG 408 according to a steam turbine recirculation line.

According to an example embodiment of the invention, the exhaust gases that are directed to the recirculation line for the gas turbine engine 402 may be provided from the HSRG 408. In particular, a control module may adjust the value 412 in order to direct recirculation of at least a portion of the exhaust gases captured by the HSRG 408, according to an example embodiment of the invention. As shown in FIG. 4, a source of these exhaust gases at the HSRG 408 may include the gas turbine engine 402 and/or the steam turbine 409. An additional source of exhaust gases may be one or more heating elements within the HSRG 408. In addition to controlling the valve 412, the control module may also operate the cooler 413 to lower the temperature of the exhaust gases for the recirculation line for the gas turbine engine 402, according to an example embodiment of the invention. It will also be appreciated that if the filter 414 is an electronically operated filter, it may likewise be controlled by the control module to assist in removing particulate matter from the exhaust gases in the recirculation line.

FIG. 5 illustrates a turbine system 500 that includes both a gas turbine engine 502 and a steam turbine engine 509, according to an example embodiment of the invention. The gas turbine engine 502, which is similar to the turbine engine 102 of FIG. 1, may comprise a compressor 503, a combustor 504, a rotor or shaft 505, a turbine component 506, and a generator 508, according to an example embodiment of the invention. According to an example embodiment of the invention, the exhaust gases from the turbine component 506 may be provided to a heat recovery steam generator (HSRG) 508 for reheating steam from a steam turbine engine 509. In particular, condensed steam may be received from the steam turbine engine 509 by the HSRG 508 and reheated steam may be returned to the steam turbine engine 509. The steam turbine engine 509 may then drive generator 510 via a rotor or shaft 511.

As shown in FIG. 5, there may be three valves that may control the recirculation of exhaust gases to an intake section of the gas turbine 502. For example, valves 511 and 512 may determine whether exhaust gases 509 are directed to the HSRG 508, to the recirculation line for the intake section of the gas turbine 502, or both. For example, if valve 511 were closed and valve 512 were open, then exhaust gases would be provided to the intake section, but not to the HRSG 508. Alternatively, both valves 511 and 512 may be open, and a first portion of the exhaust gases may be directed to the HSRG 508 while and a second portion of the exhaust gases may be directed to the recirculation line for the intake section of the gas turbine 502. On the other hand, valve 512 may be closed while valve 511 may be opened to direct exhaust gases to the HSRG 508, but not to the recirculation line for the intake section of the gas turbine 502 Additionally, valve 513 may be provided to control an amount of exhaust gases from the HSRG 508 that is directed towards the intake section of the turbine 502 via the recirculation line. According to an example embodiment of the invention, the control module may determine the source of the exhaust gases—that is, from the HSRG 508 and/or steam turbine 509—to direct to the recirculation line for the intake section of the gas turbine engine 502. For example, if the temperature differential is large at the intake, then higher-temperature exhaust gases may be provided from the HSRG 508 for the recirculation line. On the other hand, if the temperature differential is smaller at the intake, then the lower-temperature exhaust gases may be provided from the steam turbine 509 for the recirculation line.

It will be appreciated that many variations of the turbine systems described herein. According to an alternative embodiment of the invention, the recirculated exhaust gases may not be mixed directly with the inlet air to raise the temperature of the inlet air. Instead, heat may be obtained from the recirculated exhaust gases in the recirculation line via one or more thermal dissipation mechanisms, including heat sinks or fins associated with the recirculation line. In this way, performance-decreasing gases such as NOx may not need to be reintroduced into the turbine system.

FIG. 6 provides an example chart that demonstrates an effect of ambient temperature variations on gas turbine output (kW), efficiency (EFF), and combined cycle (cc), according to an example embodiment of the invention. As shown in FIG. 6, an optimal temperature may be at or around the temperature of an ISO-day 602. According to an example embodiment of the invention, the temperature of the ISO-day 602 (or standard day) may be around 59° F.

Many other modifications and other embodiments of the inventions set forth herein will come to mind to one of ordinary skill in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for exhaust gas recirculation, comprising: receiving, via an intake section, inlet air at an input of a compressor; generating compressed air at the compressor using the received inlet air; providing the compressed air from the compressor to a combustor, wherein the combustor produces combustion products using the compressed air and fuel; receiving combustion products associated with the combustion at a turbine component, wherein the turbine component releases first exhaust gases, wherein the compressor, the combustor, and the turbine component are part of a gas turbine engine; delivering the first exhaust gases to a heat recovery steam generator (HRSG) for reheating condensed steam obtained from a steam turbine engine; delivering reheated steam from the HRSG to the steam turbine engine, and controlling one or more valves for recirculating exhaust gases and steam from the HRSG and steam turbine engine to the intake section via a recirculation line, wherein the recirculated exhaust gases and steam are provided from both of the HRSG and the steam turbine engine, wherein the recirculated exhaust gases and steam raise a temperature of the inlet air.

2. The method of claim 1, wherein the recirculation line includes a heat exchanger that is operative to lower a temperature of the exhaust gases and steam in the recirculation line.

3. The method of claim 1, wherein the inlet air includes at least a portion of the recirculated exhaust gases and steam.

4. The method of claim 1, further comprising:
receiving, at a control module, temperature data from a sensor, wherein based at least in part on the received temperature data, the control module is operative to control the one or more valves, thereby controlling an amount of exhaust gases and steam recirculated to the intake section via the recirculation line.

5. The method of claim 4, wherein if the received temperature data is lower than a predetermined temperature or temperature range, then the control module is operative to place at least a portion of the one or more valves in an open position for recirculating exhaust gases and steam to the intake section via the recirculation line.

6. The method of claim 1, further comprising:
treating the recirculated exhaust gases and steam with a catalytic converter, wherein the catalytic converter removes one or more pollutants from the recirculated exhaust gases and steam.

7. A system for exhaust gas recirculation, comprising: a compressor, wherein the compressor receives inlet air via an intake section and generates compressed air using the received inlet air; a combustor that receives fuel and compressed air generated by the compressor, wherein the combustor produces combustion products using the compressed air and fuel; a turbine component that receives combustion products associated with the combustion, wherein the turbine component releases first exhaust gases, wherein the compressor, the combustor, and the turbine component are part of a gas turbine engine; a heat recovery steam generator (HRSG) for reheating condensed steam obtained from a steam turbine engine, wherein the reheated steam is delivered from the HRSG to the steam turbine engine; one or more valves for selecting one or both of the HRSG or the steam turbine engine to provide exhaust gases and steam for recirculation; and a recirculation line for recirculating exhaust gases and steam from both of the HRSG and the steam turbine engine to the intake section, wherein the recirculated exhaust gases and steam raise a temperature of the inlet air.

8. The system of claim 7, wherein the recirculation line includes a heat exchanger that is operative to lower a temperature of the exhaust gases steam in the recirculation line.

9. The system of claim 7, wherein the inlet air includes at least a portion of the recirculated exhaust gases and steam.

10. The system of claim 7, further comprising:
a control module, wherein the control module receives temperature data from a sensor, and based at least in part on the received temperature data, controls the one or more valves for recirculating exhaust gases and steam from one or both of the HRSG and the steam turbine engine to the intake section via a recirculation line.

11. The system of claim 10, wherein if the received temperature data is lower than a predetermined temperature or temperature range, then the control module is operative to place at least a portion of the one or more valves in an open position for recirculating exhaust gases and steam to the intake section via the recirculation line.

12. The system of claim 7, further comprising: a catalytic converter for treating the recirculated exhaust gases, wherein the catalytic converter removes pollutants from the recirculated exhaust gases.

13. A system for exhaust gas recirculation, comprising: a compressor, wherein the compressor receives inlet air via an intake section and generates compressed air using the received inlet air; a combustor that receives fuel and compressed air generated by the compressor, wherein the combustor produces combustion products utilizing the compressed air and fuel; a turbine component that receives combustion products associated with the combustion, wherein the turbine component releases first exhaust gases, wherein the compressor, the combustor, and the turbine component are part of a gas turbine engine; a heat recovery steam generator (HRSG) for reheating condensed steam obtained from a steam turbine engine, wherein the reheated steam is delivered from the HRSG to the steam turbine engine; first means for selecting both of the HRSG and the steam turbine engine to provide exhaust gases and steam for recirculation; and second means for recirculating at least a portion of the exhaust gases and steam from both of the HRSG and the steam turbine engine in accordance with the first means to the intake section, wherein the recirculated exhaust gases and steam raise a temperature of the inlet air.

14. The system of claim 13, further comprising: a control module, wherein the control module receives temperature data from a sensor, and based at least in part on the received temperature data, controls the first means for recirculating exhaust gases and steam to the intake section via the second means.

15. The system of claim 14, wherein if the received temperature data is lower than a predetermined temperature or temperature range, then the control module is operative to place at least a portion of the first means in an open position for recirculating exhaust gases and steam to the intake section via the recirculation line.

16. The system of claim 13, wherein the first means comprises one or more valves.

17. The system of claim 13, wherein the second means comprises one or more recirculation lines or piping.

18. The system of claim 17, wherein the second means further comprises one or more of (i) a heat exchanger, or (ii) a catalytic converter.

* * * * *